US006980834B2

(12) United States Patent
Gupta et al.

(10) Patent No.: US 6,980,834 B2
(45) Date of Patent: *Dec. 27, 2005

(54) METHOD AND APPARATUS FOR PERFORMING TEXT TO SPEECH SYNTHESIS

(75) Inventors: Vishwa N. Gupta, Brossard (CA); Paul Boucher, Ile des Soeurs (CA)

(73) Assignee: Nortel Networks Limited, St. Laurent (CA)

( * ) Notice: Subject to any disclaimer, the term of this patent is extended or adjusted under 35 U.S.C. 154(b) by 303 days.

This patent is subject to a terminal disclaimer.

(21) Appl. No.: 10/310,545

(22) Filed: Dec. 5, 2002

(65) Prior Publication Data

US 2003/0083105 A1 May 1, 2003

Related U.S. Application Data

(63) Continuation of application No. 09/456,999, filed on Dec. 7, 1999, now Pat. No. 6,516,207.

(51) Int. Cl.[7] ............................................... H04B 1/38
(52) U.S. Cl. ...................... 455/563; 455/466; 455/553; 455/456.1
(58) Field of Search ............................... 455/563, 466, 455/456.1

(56) References Cited

U.S. PATENT DOCUMENTS

| 4,330,689 | A | 5/1982 | Kang et al. ............ 179/15.55 R |
| 4,472,832 | A | 9/1984 | Atal et al. ..................... 381/40 |
| 4,685,135 | A | 8/1987 | Lin et al. ...................... 381/52 |
| 4,695,962 | A | 9/1987 | Goudie .................... 364/513.5 |
| 4,872,202 | A | 10/1989 | Fette ........................... 381/52 |
| 6,157,845 | A | 12/2000 | Henry et al. ................. 455/553 |
| 6,516,207 | B1 * | 2/2003 | Gupta et al. ................ 455/563 |

* cited by examiner

Primary Examiner—Erika A. Gary
Assistant Examiner—Wayne Cai

(57) ABSTRACT

A data communication terminal, such as a cellular telephone, capable of synthesizing speech. The data communication terminal can establish a communication session with a base station over a transmission facility implementing a voice channel and a data channel. The data communication terminal includes a speech synthesizer engine that receives from the remote entity a signal transmitted over the data channel and that conveys the vocal tract characteristics of the message to be delivered as a spoken announcement. The base station generates the signal containing the vocal tract characteristics from a text-based signal of the message to be synthesized. The invention also extends to a base station that can convert the text based message to be synthesized into a signal containing vocal tract characteristics and that sends the signal to a remote terminal over the data channel.

23 Claims, 5 Drawing Sheets

METHOD AND APPARATUS FOR PERFORMING TEXT TO SPEECH SYNTHESIS

CROSS-REFERENCE TO RELATED APPLICATIONS

This application is a continuation of prior application U.S. Ser. No. 09/456,999 filed on Dec. 7, 1999, now issued as U.S. Pat. No. 6,516,207 B1, which is hereby incorporated by reference.

FIELD OF THE INVENTION

The present invention relates to the field of synthesizing speech and in particular to a method and to an apparatus in which the speech synthesis function is distributed between two components that communicate with one another over a transmission facility. The invention finds practical applications in digital cellular telephony where it is desirable to deliver messages to the subscriber as spoken announcements. The invention also extends to a digital cellular terminal featuring speech synthesis capability.

BACKGROUND OF THE INVENTION

Currently, the short message service (SMS) feature is used to send short text-based messages to the digital cellular terminal to display various messages, including the number/name of the called party, message headers of pending messages, and various alert messages. In a situation where the user's eyes are busy, for example, while driving or while performing tasks requiring visual attention, the user cannot read these messages. Spoken announcements synthesized at the terminal would alleviate his problem.

One possibility to overcome this problem is to perform complete speech synthesis at the terminal. This could be achieved by transmitting the text of the message to the terminal where a speech synthesis unit will generate audible speech. However, this possibility is not practical because the terminal would necessitate a significant amount of computing power and memory, which are not available at terminals found today in the marketplace.

Against this background it clearly appears that there is a need to improve the existing functionality of remote terminals as it relates to their ability to synthesize speech. In particular, a need exists in the industry to develop remote terminals having the ability to deliver speech synthesis functions to the user without necessitating significant increases in computing and memory resources.

SUMMARY OF THE INVENTION

In one aspect, the present invention provides a communication terminal that is capable of establishing a communication session with a remote entity over a transmission facility implementing two different channels. The first channel, so-called voice channel is used for transporting a speech signal between the terminal and the remote entity. The second channel, so-called data channel is used for sending short messages to the terminal. The voice channel is characterized by a larger bandwidth capacity than the data channel.

The terminal includes a speech synthesizer engine that receives vocal tract information sent from the remote entity over the data channel such as to create a spoken announcement of the message.

Under one specific example of implementation, the communication terminal is a digital cellular terminal hat can be either mobile or fixed. Under this example, the remote entity is the base station of the network with which the terminal communicates. When a message is to be delivered to the terminal as a spoken announcement, the base station processes the text of the message to generate the vocal tract information and transmits the vocal tract information over the data channel. This approach transfers at least some of the processing to effect the speech synthesis to the base station that has significant computing resources. The vocal tract information that is sent to the terminal over the data channel is a low bit rate signal that can be converted into a spoken announcement with minimal computation. This function can be implemented easily at a terminal.

In a different aspect, the invention also provides a base station for use in a digital cellular network. The base station can establish a communication session with a remote terminal over a transmission facility featuring a data channel and a voice channel. The base station has an input for receiving a textual message that is to be delivered as a spoken announcements at the remote terminal. The base station has a speech synthesis pre-processing unit that receives the signal conveying the textual message to generate the corresponding vocal tract information. The base station transmits of the vocal tract information to the remote terminal over the data channel. The remote terminal can then use the vocal tract information to generate the audio representation of the textual message.

The invention also extends to a communication terminal that can notify the remote entity with which it establishes a communication, of the kind a resident speech synthesizer it is currently implementing. Under one possible form of implementation, the notification sent to the remote entity causes the remote entity to upload to the terminal an updated version or a different version of the speech synthesizer engine in the case where the resident speech synthesizer engine is not suitable for the operation or needs updating or changing. A different possibility is to provide at the base station a pool of speech synthesis pre-processing units and to use the notification issued by the remote terminal to select the particular speech synthesis pre-processing unit that matches the speech synthesizer engine implemented at the terminal.

The invention also extends to a method for performing speech synthesis at a communication terminal and also to a method for performing speech synthesis pre-processing at a base station of a digital cellular network. The invention also provides a method for upgrading or altering a speech synthesizer engine in a communication terminal through interaction with a remote entity with which the terminal communicates. Finally, the invention relates to a method for performing a speech synthesis pre-processing unit selection at a base station of the digital network based on the type of the speech synthesizer engine residing at the remote terminal with which the base station communicates.

Other aspects and features of the present invention will become apparent to those ordinarily skilled in the art upon review of the following description of specific embodiments of the invention in conjunction with the accompanying figures.

DETAILED DESCRIPTION

Figure 1:
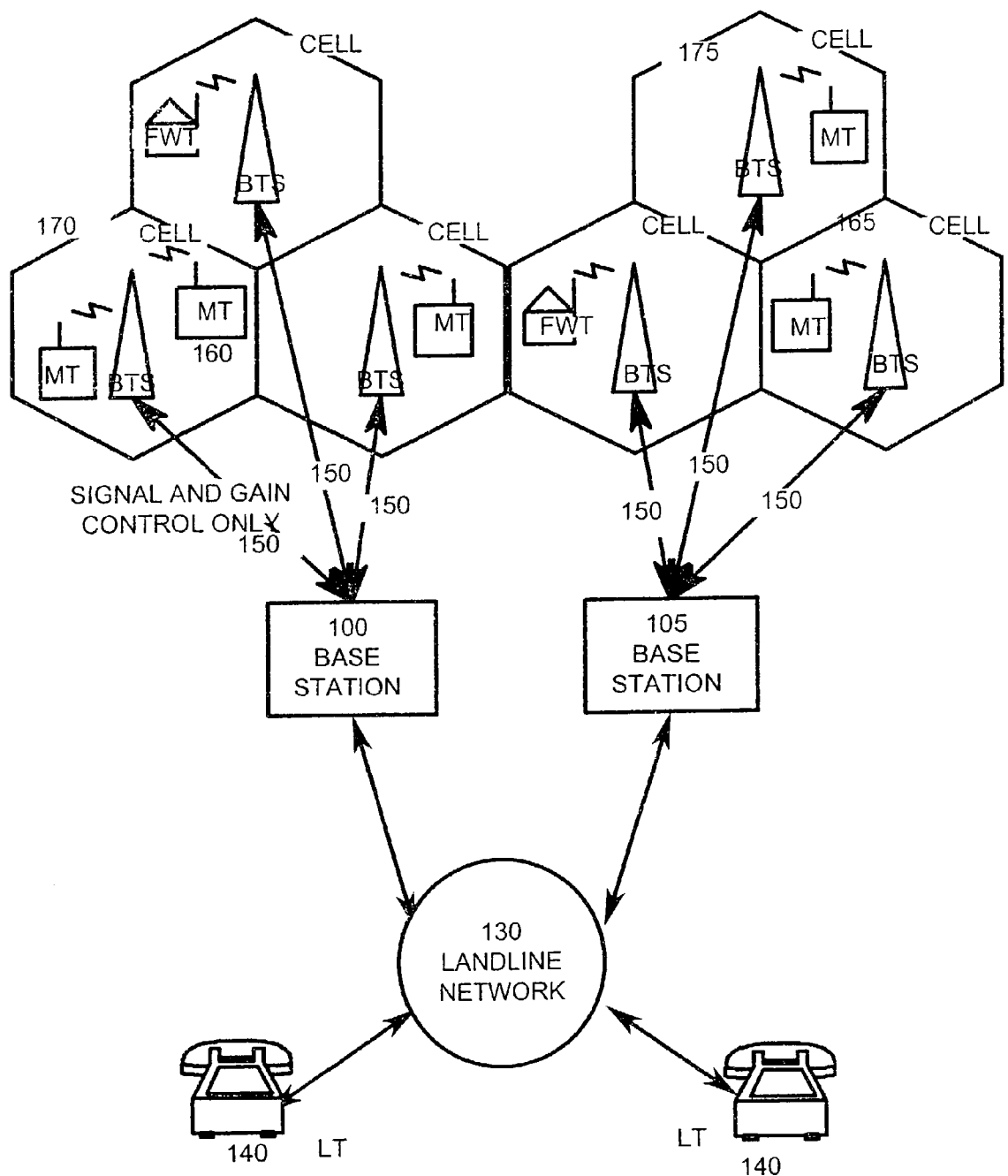
FIG. 1 is a block diagram illustrating a mobile-to-mobile digital cellular system connection through the Public Switched Telephone Network (PSTN)

FIG. 1 is a block diagram representation of a portion of a cellular wireless telecommunications network. In this figure, Mobile Terminals (MT) are on the move in the hexagonal areas defined as cells. Fixed wireless terminals (FWT) are also included in the areas defined as cells. Each cell covers a predetermined geographical area and has a Base Transceiver Station (BTS), which communicates through radio channels with the MTs and FWTs. A typical communication protocol between the BTSs and the MTs and FWTs may be a Time division multiple access (TDMA) protocol. Alternatively, the communication protocol could be a code division multiple access (CDMA) or groupe station mobile GSM protocol, among others. For purposes of illustration, assume hereinafter that a TDMA protocol is in effect. A number of these BTSs (i.e. cells) may be connected by land line or microwave link 150 to one Base Station Controller 100, 105 (BSC), referred in this specification as the base station, which controls handoff functions, speech synthesis pre-processing functions, among others, and routes the signal as requested. Each BSC 100, 105 is connected to a landline network 130. The landline network 130 may include, among others, the PSTN, the Integrated Services Digital Network and the Internet. Land terminals 140 (LT) connected to the landline network 130 are also shown for completeness.

When the base station 100 communicates with a remote terminal, the communication is effected over a transmission facility that implements a voice channel and a data channel. In this particular example, the transmission facility is the air interface. Other possibilities include physical conductors such as cable, optical transmission medium, amongst other suitable conductors. The voice channel is the primary link between the base station and the remote terminal. The voice channel is used to carry the speech sound information. The data channel is used to convey short text based messages and, possibly, control signals as well. It is not deemed necessary to further describe the structure of the transmission facility since this element is not part of the invention and its operation is well understood in he art.

Figure 2:
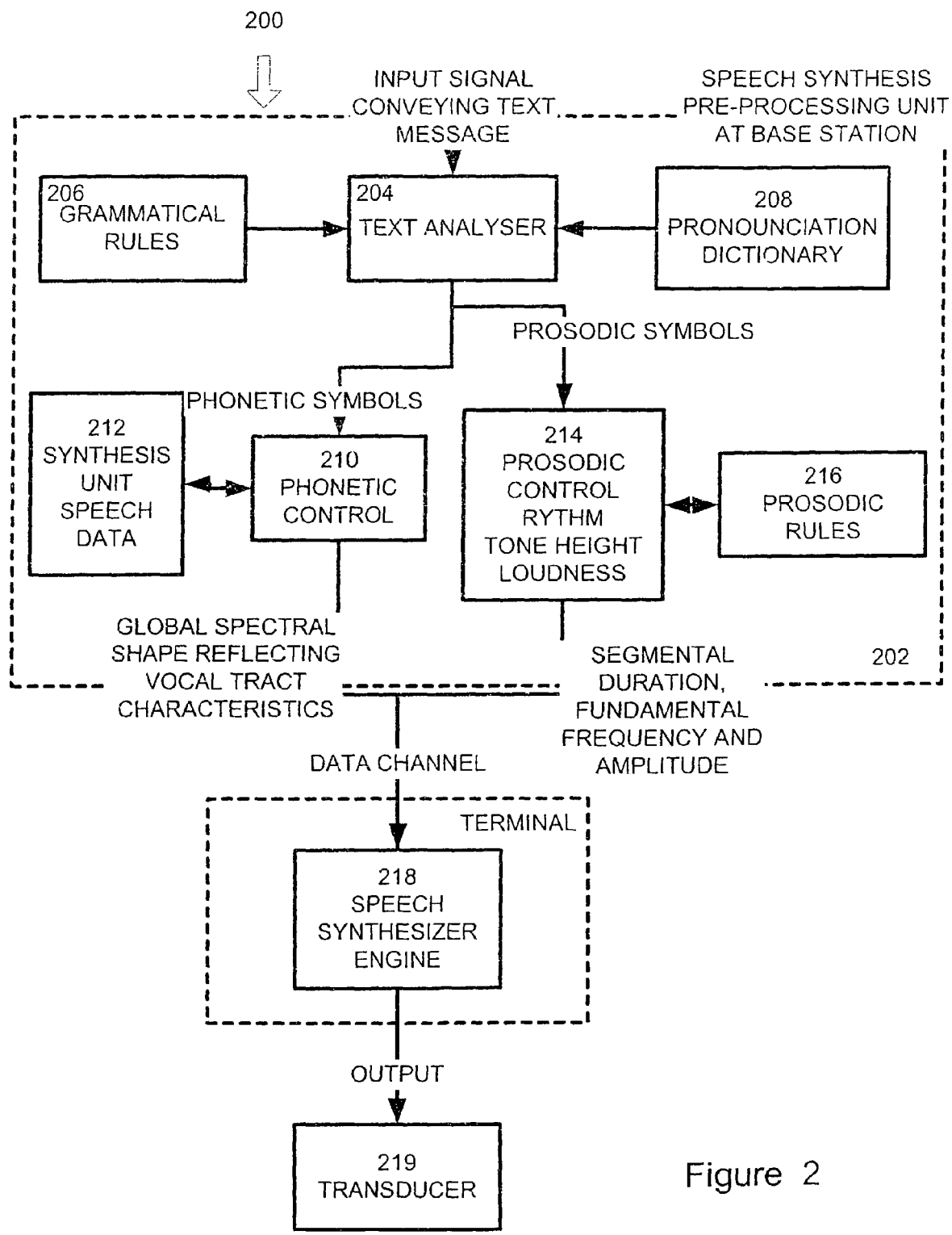
FIG. 2 is a block diagram of a text-to-speech synthesis unit having a distributed configuration, where one part of the speech synthesis unit is located in the base station of the network while another part of the speech synthesis unit is found in the terminal.

FIG. 2 illustrates the structure of the text to speech synthesizer unit embodying the principles of the present invention. The text to speech synthesizer unit comprehensively designated by the reference numeral 200 comprises a speech synthesis pre-processing unit 202 that is located at the base station of the network, say the base station 100 for the sake of this example. The purpose of the speech synthesis pre-processing unit 202 is to receive the input signal conveying in textual form the message to be audibly synthesized and to generate through proper signal processing techniques vocal tract information. The vocal tract information is contained in a signal that basically conveys how the synthetic utterance will be pronounced. In contrast to the textual only information received by the speech synthesis pre-processing unit 202, the vocal tract information defines or characterizes how the message is to be uttered. More particularly, the speech synthesis pre-processing unit 202 comprises a text analyzer 204 that receives at its input the input signal conveying the message to be synthesized in a textual form. In a specific example of implementation, the input signal is an ASCII encoded message. By using a text to phoneme conversion algorithm implemented by the grammatical rules unit 206, the text analyzer 204 will convert the incoming text into a phonetic representation. More specifically, the output of the text analyzer 204 is a succession of symbols of sounds that basically define how the text message is to be pronounced. Similarity, a pronunciation dictionary algorithm implemented by the pronunciation dictionary 208 will convert the incoming text into a prosodic representation. The signal conveying the prosodic representation is output by the text analyzer 204 concurrently with the phonetic representation.

The phonetic representation of the message is passed to a phonetic control unit 210 that generates a signal conveying the global spectral shape that reflects vocal tract characteristics. The phonetic control unit 210 communicates during the processing operation with a synthesis unit speech data 212. Similarly, the prosodic representation of the message is passed to a prosodic control unit 214 that generates a signal conveying information regarding the segmental duration, fundamental frequency and amplitude. This signal is generated by the prosodic control units 214 on the basis of prosodic rules stored in a unit 216.

The output of the phonetic control 210 and the output of the prosodic control 214 are combined into a single signal that provides the vocal tract information. The vocal tract information signal is sent over the data channel in the transmission facility linking the terminal to the base station. As mentioned earlier, in addition to the data channel the transmission facility also has a voice channel over which speech data is exchanged with the subscriber with whom a call is established. The bandwidth of the data channel is smaller than the bandwidth of the voice channel.

In a specific example of implementation, the voice tract information conveyed to the terminal over the data channel is equivalent to linear prediction coefficients (LPC) encoded speech. The output of the phonetic control 210 basically generates the coefficients of a speech frame while the output of the prosodic control 216 generates some additional parameters that are necessary to properly generate the synthetic utterance.

The part of the text to speech synthesizer unit 200 that resides in the terminal is the speech synthesizer engine 218. Continuing with the example of implementation described above, the synthesizer engine 218 is an LPC decoder that receives the vocal tract information transported on the data channel and converts this information into PCM samples. Next, the PCM samples are passed through a D/A converter that generates an analog signal. This analog signal is amplified and supplied to a transducer 219 that converts the electrical energy into audible sound. A loudspeaker is an example of such a transducer.

It is not necessary to describe in detail the structure and operation of the text to speech synthesis unit 200 since the functionality of such devices is well-known to those skilled in the art. For additional information the reader is invited to refer to Y. Sagisake, Speech Synthesis from Text, IEEE Communications Magazine, January 1990 pp. 35–41 and to T. Dutoit, An Introduction to text-to-speech Synthesis, Kluwer Academic Publishers, 1997. The contents of these documents are hereby incorporated by reference.

Figure 3:
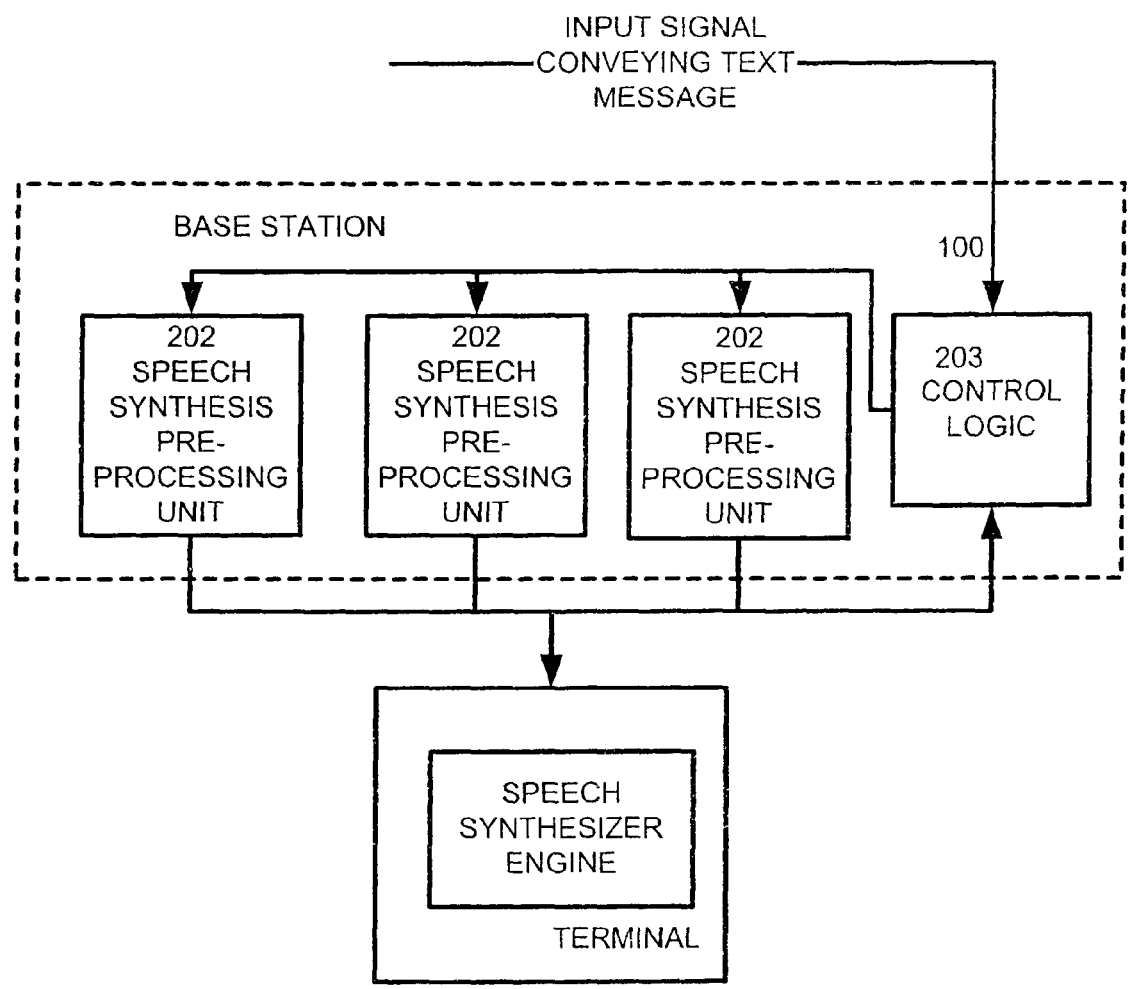
FIG. 3 is a block diagram of the base station of the network featuring a pool of speech synthesis pre-processing units that can be selectively enabled to process the text based signal from which synthetic speech is to be generated.

The example of implementation of the invention Illustrated in FIG. 2 assumes that the synthesizer engine 218 and the speech synthesizer pre-processing unit 202 are compatible. Many algorithms exist today for performing text to speech synthesis, including LPC analysis (the example provided earlier is based on this algorithm), and hybrid harmonic/stochastic synthesis, and time domain algorithms. In a practical situation a base station implementing the principles of this invention will establish a communication with a plurality of terminals where the terminals may be implementing different speech synthesis algorithms. In order to establish compatibility between the speech synthesis pre-processing unit in the base station 100 and the terminals two distinct possibilities can be considered. The first possibility is illustrated in FIG. 3. The base station 100 is provided with a plurality of speech synthesis pre-processing units 202, each unit being designed to operate according to a different algorithm. A control logic functional unit 203 receives the input signal containing the textual information to be synthesized and routes the signal to a selected one of the speech synthesis pre-processing unit 202.

The terminal is designed to transfer to the base station an identifier that will uniquely identify the type of speech synthesizer engine 218 that presently resides in the terminal. This identifier can be sent at different times but it is preferred to send it over the data channel during call setup. When the control logic functional unit 203 receives this identifier it can then identify which ones of the speech synthesis pre-processing units 202 can interoperate with the resident speech synthesizer engine 218. Accordingly, the control logic functional unit 203 will route the input signal containing the textual information to the proper speech synthesis pre-processing unit 202.

Figure 4:
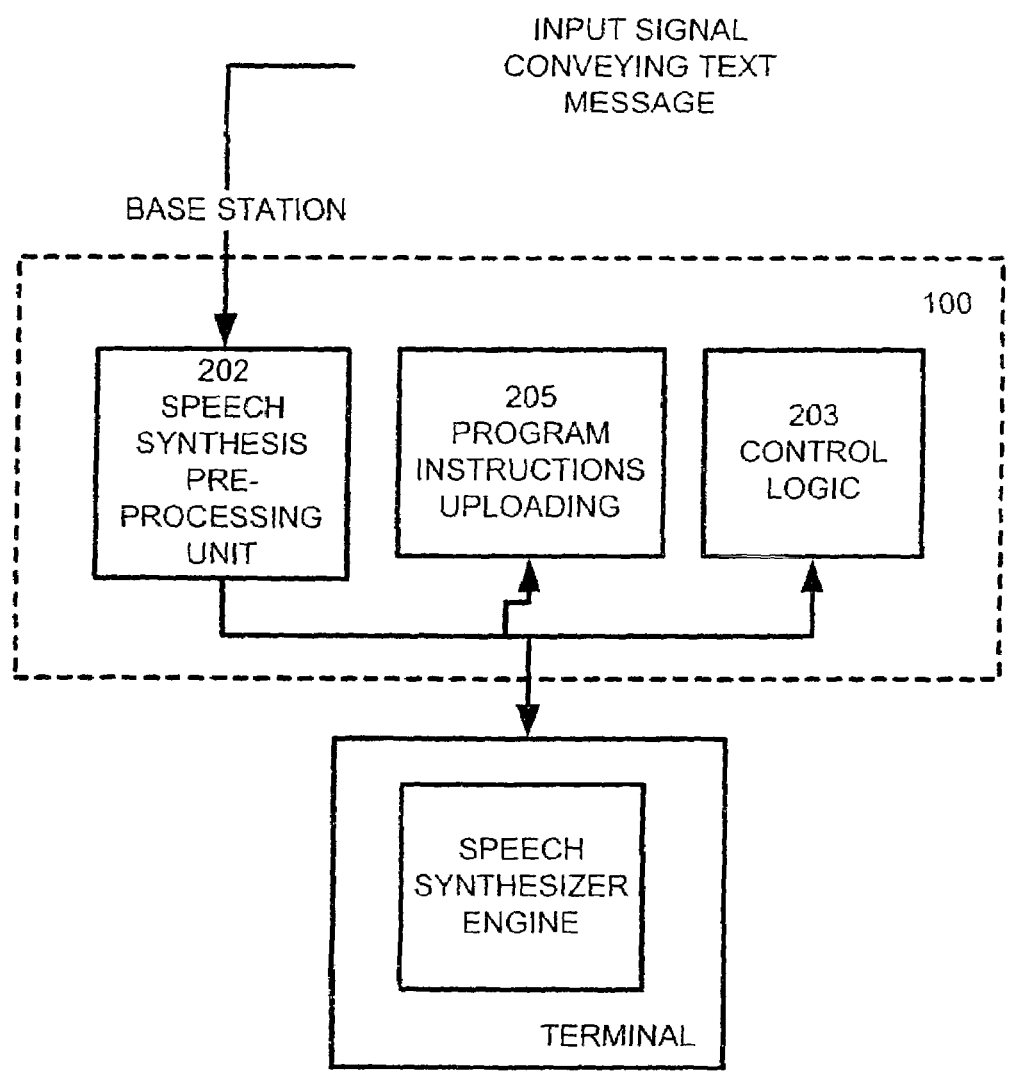
FIG. 4 is a block diagram of a variant of the base station depicted in FIG. 3.
Figure 5:
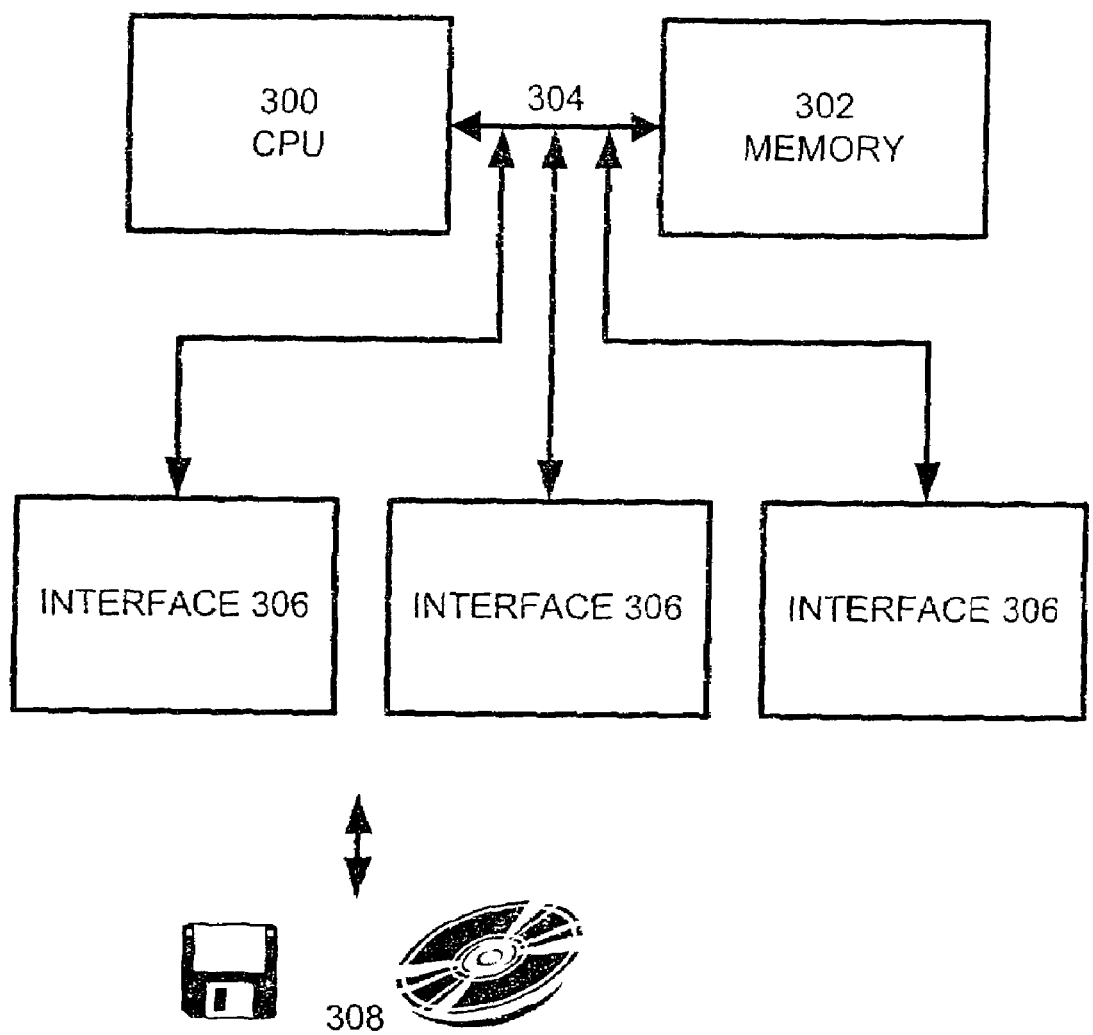
FIG. 5 is a block diagram of a generic computing apparatus on which the functionality of the remote terminal and the base station in accordance with the present invention can be implemented with software.

The second possibility is to update or simply change the speech synthesis engine 218 to suit the speech synthesis pre-processing, unit 202 in the base station 100. This possibility is illustrated in FIG. 4 of the drawings. In a specific example of implementation, during call setup, the terminal transmits to the base station the identifier that will uniquely identify the type of speech synthesizer engine 218 present in the terminal. The base station 100 receives this information and the control logic functional unit 203 compares it against the speech synthesis pre-processing unit 202 currently installed. If a match exists, call setup proceeds normally. Otherwise, the control logic functional unit 203 sends a control signal to a program element uploading functional unit 205 that sends to the terminal, over the data channel, the program element to replace the resident speech synthesizer engine 218 with a new program element operative to interoperate with the base station 100. Under this mode of operation the speech synthesizer unit 218 is updated at regular intervals which allows to bring about improvements to the speech synthesis functionality of the terminal without the necessity for the user to acquire a new terminal.

The speech synthesis pre-processing unit 202 and the speech synthesizer engine 218 are implemented in software that is executed on any suitable computing platform. More specifically, since the speech synthesis pre-processing unit 202 and the speech synthesizer engine 218 run in independently from one another, they are implemented on two separate computing platforms, namely the base station and the terminal. The structure of such computing platform is illustrated in FIG. 4. The computing platform includes a central processing unit 300, a memory 302 connected to the central processing unit over a bus 204. In addition to these two components, the computing platform also includes a number of interfaces 306 that allow the central processing unit 300 to exchange signals with the external world. It is not deemed necessary to provide a detailed discussion of such computing platform since it's structure and operation are well-known to those skilled in the art.

The memory 302 is divided in two sections, one section being used for holding the program instructions that implement the functionality of the speech synthesis pre-processing unit 202 or of the speech synthesizer engine 218. The other section of the memory holds the data on which the program instructions operate. In particular, the input signal or any intermediate data generated during computations would be held in the second portion of the memory.

The speech synthesis pre-processing unit 202 and the speech synthesizer engine 218 can exist externally of the computing platform as a set of program instructions recorded or stored on a machine readable storage medium 308. Such machine readable storage medium can be a floppy disk, a CD-ROM or any other suitable nonvolatile storage medium that can be read by a computing platform to extract the program instructions and then execute them in order to implement the desired functionality.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. A communication terminal operative for establishing a communication session with a remote entity over a transmission facility implementing a voice channel and a data channel, the voice channel permitting exchange of signals between the communication terminal and the remote entity of signals conveying speech sound information, the communication terminal comprising:

an input for receiving a signal conveying vocal tract information of a message to be synthetically uttered, transported on the data channel;

a speech synthesizer engine coupled to the input and operative to process the signal conveying vocal tract information of a message to be synthetically uttered to generate an audio output signal; and a transducer coupled to the speech synthesizer engine for receiving the audio output signal and generating a spoken announcement of the message.

2. A communication terminal as defined in claim 1 wherein the signal conveying vocal tract information of a message to be synthetically uttered comprises LPC encoded synthetic speech information.

3. A communication terminal as defined in claim 2 wherein the communication terminal is a cellular telephone.

4. A communication terminal as defined in claim 1 wherein the communication terminal is operative to transmit to the remote entity an identifier that conveys identification information on the speech synthesizer engine.

5. A communication terminal as defined in claim 4 wherein the communication terminal is operative to transmit to the remote entity the identifier that conveys identification information on the speech synthesizer engine over the data channel.

6. A communication terminal as defined in claim 1 further comprising a computing platform operative to execute a program element to implement the speech synthesizer engine.

7. A communication terminal as defined in claim 6 wherein the speech synthesizer engine comprises a resident speech synthesizer engine, the communication terminal operative to download a program element to replace the resident speech synthesizer engine with a different speech synthesizer engine.

8. A base station for use in a digital cellular network, the base station being operative to establish a communication session with a remote terminal over a transmission facility implementing a voice channel and a data channel, the voice channel permitting exchange of signals conveying speech sound information between the remote terminal and the base station, the base station comprising:
- an input for receiving an input signal conveying a text message;
- a speech synthesis pre-processing unit coupled to the input for receiving the input signal conveying the text message, the speech synthesis pre-processing unit being operative to process the input signal conveying the text message to generate a signal conveying vocal tract information of a synthetic utterance that constitutes a spoken announcement of the text message; and
- an output for releasing the signal conveying vocal tract information of a synthetic utterance that constitutes a spoken announcement of the text message for transmission over the data channel toward the remote terminal.

9. A base station as defined in claim 8 wherein the signal conveying vocal tract information of a synthetic utterance that constitutes a spoken announcement of the text message comprises LPC encoded synthetic speech information.

10. A base station as defined in claim 8 wherein the base station further comprises:
- a plurality of speech synthesis pre-processing units;
- a control logic functional unit responsive to a reception of an identifier that conveys identification information on a speech synthesizer engine from a remote terminal, to direct the input signal conveying a text message toward one of the plurality of speech synthesis pre-processing units derived from the identifier.

11. A base station as defined in claim 8 wherein the base station further comprises:
- an uploadable program element, the uploadable program element when executed on a computing platform implementing the functionality of a speech synthesizer engine operative to process the signal conveying vocal tract information of a synthetic utterance that constitutes a spoken announcement of the text message, to generate an audio output signal; and
- a control logic functional unit responsive to reception of an identifier that conveys identification information on a resident speech synthesizer engine in a remote terminal to derive if the resident speech synthesizer engine is capable to interoperate with the speech synthesis pre-processing unit, and when the resident speech synthesizer engine is not capable to interoperate with the speech synthesis pre-processing unit the control logic functional unit being operative to cause uploading of the uploadable program element in the remote terminal to cause replacement of the resident speech synthesizer engine by a speech synthesizer engine implemented by the uploadable program element.

12. A communication terminal operative for establishing a communication session with a remote entity over a transmission facility implementing a voice channel and a data channel, the voice channel permitting exchange of signals between the communication terminal and the remote entity of signals conveying speech sound information, the communication terminal comprising:
- an input means for receiving a signal conveying vocal tract information of a message to be synthetically uttered, transported on the data channel;
- a speech synthesizer engine means coupled to the input means and operative to process the signal conveying vocal tract information of a message to be synthetically uttered to generate an audio output signal; and
- a transducer means coupled to the speech synthesizer means for receiving the audio output signal and generating a spoken announcement of the message.

13. A method for synthesizing speech at a communication terminal operative for establishing a communication session with a remote entity over a transmission facility implementing a voice channel and a data channel, the voice channel permitting exchange of signals between the communication terminal and the remote entity of signal conveying speech sound information, the method comprising:
- transmitting to the remote terminal over the data channel a signal conveying vocal tract information of a message to be synthetically uttered;
- processing the signal conveying vocal tract information of a message to be synthetically uttered to generate an audio output signal; and
- generating a spoken announcement of the message in response to the audio output signal.

14. A method for generating a signal suitable for use by a communication terminal to synthesize speech, the method comprising:
- supplying to a base station an input signal conveying a text message, the base station being suitable for use in a digital cellular network, the base station operative to establish a communication session with the communication terminal over a transmission facility implementing a voice channel and a data channel, the voice channel permitting exchange of signals conveying speech sound information between the communication terminal and said base station, the base station being operative for:
  - processing the input signal conveying the text message to generate a signal conveying voice tract information of a synthetic utterance that constitutes a spoken announcement of the text message, and
  - transmitting the signal conveying vocal tract information of a synthetic utterance that constitutes a spoken announcement of the text message over the data channel toward the communication terminal.

15. A communication system comprising:
- a base station for use in a digital cellular network;
- a communication terminal;
- a transmission facility between the base station and said communication terminal, the transmission facility implementing a voice channel and a data channel, the voice channel permitting exchange of signal conveying speech sound information between said communication terminal and said base station, the base station comprising:
  - an input for receiving an input signal conveying a text message,
  - a speech synthesis pre-processing unit coupled to the input for receiving the input signal conveying the text message, the speech synthesis pre-processing unit operative to process the input signal conveying the text message to generate a signal conveying vocal tract information of a synthetic utterance that constitutes a spoken announcement of the text message, an output for releasing the signal conveying vocal tract information of a synthetic utterance that constitutes a spoken announcement of the text message for transmission over the data channel toward the communication terminal; and and wherein the communication terminal comprises:

an input coupled to the data channel for receiving the signal conveying vocal tract information of a synthetic utterance that constitutes a spoken announcement of the text message, a speech synthesizer engine coupled to the input of the communication terminal and operative to process the signal conveying vocal tract information of a synthetic utterance that constitutes a spoken announcement of the text message, to generate an audio output signal, and a transducer coupled to the speech synthesizer for receiving the audio output signal and generating a spoken announcement of the message.

16. A communication system as defined in claim 15 wherein the signal conveying vocal tract information of a synthetic utterance that constitutes a spoken announcement of the text message comprises LPC encoded synthetic speech information.

17. A communication system as defined in claim 15 wherein the communication terminal is a cellular telephone.

18. A communication system as defined in claim 15 wherein the communication terminal is operative to transmit to said base station an identifier that conveys identification information on the speech synthesizer engine.

19. A communication system as defined in claim 18 wherein the communication terminal is operative to transmit to the base station the identifier that conveys identification information on the speech synthesizer engine over the data channel.

20. A communication system as defined in claim 15 further comprising a computing platform operative to execute a program element to implement the speech synthesizer engine.

21. A communication system as defined in claim 20 wherein the speech synthesizer engine is a resident speech synthesizer engine, the communication terminal is operative to download a program element from the base station to replace the resident speech synthesizer engine with a different speech synthesizer engine.

22. A communication system as defined in claim 15 wherein the base station further comprises:

a plurality of speech synthesis pre-processing units; and a control logic functional unit responsive to a reception of an identifier from the communication channel that conveys identification information on the speech synthesizer engine, to direct the input signal conveying a text message toward one of the speech synthesis pre-processing units derived from the identifier.

23. A communication system as defined in claim 22 wherein the base station further comprises:

an uploadable program element, the uploadable program element when executed on a computing platform implementing the functionality of a speech synthesizer engine operative to process the signal conveying vocal tract information of a synthetic utterance that constitutes a spoken announcement of the text message, to generate an audio output signal;

a control logic functional unit responsive to a reception of an identifier that conveys identification information on a resident speech synthesizer engine in the communication terminal to derive if the resident speech synthesizer engine is capable to interoperate with the speech synthesis pre-processing unit, and when the resident speech synthesizer engine is not capable to interoperate with the speech synthesis pre-processing unit the control logic functional unit being operative to cause uploading of the uploadable program element in that communication terminal to cause replacement of the resident speech synthesizer engine by a speech synthesizer engine implemented by the uploadable program element.

* * * * *